United States Patent [19]

Tyler et al.

[11] 4,386,958
[45] Jun. 7, 1983

[54] PROCESS AND FLOTATION BOX FOR INCLUSION REMOVAL

[75] Inventors: Derek E. Tyler, Cheshire; Ik Y. Yun, Orange; Patrick D. Renschen, Middletown, all of Conn.

[73] Assignee: Olin Corporation, New Haven, Conn.

[21] Appl. No.: 260,138

[22] Filed: May 4, 1981

[51] Int. Cl.³ .................. C22B 9/02; B22D 11/10
[52] U.S. Cl. .............................. 75/93 R; 75/68 R; 164/134; 164/337; 164/437; 222/590; 222/607; 266/229; 266/231
[58] Field of Search ............ 164/134, 337, 437, 335, 164/488, 489; 222/564, 590, 607; 266/228, 229, 231, 206, 207, 216; 75/68 R, 93 R

[56] References Cited

U.S. PATENT DOCUMENTS

| | | |
|---|---|---|
| 214,746 | 4/1879 | Baker . |
| 535,514 | 3/1895 | Van Riet . |
| 1,983,578 | 12/1934 | Chandler ........................ 164/134 |
| 2,741,556 | 4/1956 | Schwartz ....................... 266/216 X |
| 2,770,021 | 11/1956 | Harter, Jr. et al. ............. 266/231 X |
| 3,281,238 | 11/1963 | Bachowski et al. . |
| 3,537,987 | 8/1969 | Copeland . |
| 3,628,596 | 12/1971 | Easdon et al. ................... 164/440 |
| 3,831,659 | 8/1974 | Gerding et al. .................. 164/488 |
| 3,865,175 | 2/1975 | Listhuber et al. . |
| 4,174,965 | 11/1979 | Buxmann . |

FOREIGN PATENT DOCUMENTS 50-38366  12/1975  Japan ............................. 266/231

Primary Examiner—Gus T. Hampilos
Attorney, Agent, or Firm—Howard M. Cohn; Barry L. Kelmachter; Paul Weinstein

[57] ABSTRACT

A process and apparatus are disclosed for removing inclusions and inclusion clusters from a molten metal or alloy stream prior to casting. In the process, the molten metal is passed through a flotation box having a primary chamber and a secondary chamber located within the primary chamber. The primary chamber is provided with entry and exit portions, one on each side of the secondary chamber so that the stream of molten metal or alloy is directed to flow into the primary chamber, flowing beneath the secondary chamber and out the exit portion. Inclusions and inclusion clusters float to the surface of the molten metal or alloy in the secondary chamber prior to the exiting of the molten metal or alloy stream from the primary chamber through the exit portion for supply to a casting station.

6 Claims, 3 Drawing Figures

PROCESS AND FLOTATION BOX FOR INCLUSION REMOVAL

This application is a continuation of application Ser. No. 26,147, filed Apr. 2, 1979 now abandoned.

BACKGROUND OF THE INVENTION

It is known that inclusions, present either individually or in clusters, are usually detrimental in metal products. Such inclusions can impair the mechanical properties of the end product, impair formability and present serious cosmetic problems in cold rolled sheet, and when very severe, can limit the hot and cold rollability of cast ingots.

PRIOR ART STATEMENT

The prevention or modification of inclusion formation, and/or the removal of inclusions once they do form, is known to be necessary for given metals and alloy systems. Manganese for example, is widely used in the steel industry to modify the nature of the sulfide that forms in the molten metal. Aluminum alloys are frequently cast using a filter in a transfer launder to remove aluminum oxide inclusions in particular. The filter can be either of a filter bed type or of a ceramic foam type. In this regard reference is made to U.S. Pat. Nos. 3,281,238 to Bachowski et al. and 3,537,987 to Copeland which patents describe containers having entry and exit portions, at least one of which is provided with filtering media.

Use of a tundish to remove initial amounts of non-metallic inclusions from molten steel in a continuous casting plant is shown in U.S. Pat. No. 3,865,175 to Listhuber et al. The covered tundish of the Listhuber et al '175 patent is a covered container having a tube and canal means for feeding molten steel down and then up so as to develop a predetermined velocity of metal flow toward the surface of the molten steel in the container. The use of the tundish in the Listhuber et al. '175 patent is considered as only a primary separation since only part of the non-metallic inclusions contained in the molten steel is flushed into and retained by a slag or casting powder layer located on the top surface of the molten steel in the container.

It is also known to utilize pouring gates provided with chambers connected in series to prevent floating impurities in molten metal from passing into a casting mold. Such passing gates are depicted In U.S. Pat. Nos. 214,746 to Baker and 535,514 to Van Riet.

The aforenoted patents either do not remove all the inclusions and/or are characterized by a high degree of turbulent flow. When the inclusions are of a similar density to the molten metal or alloy density, fast or turbulent flow renders it impossible to get the degree of inclusion removal required.

All prior art patents disclosed and discussed herein are hereby incorporated by reference.

SUMMARY OF THE INVENTION

This invention describes the use of a flotation box, which provides an alternative to filtration as a means to remove inclusions and inclusion clusters from a molten metal or alloy stream in a transfer launder prior to casting. In the flotation box, buoyant inclusions and inclusion clusters float up and out of a molten metal stream where they can be skimmed from the metal being cast.

The flotation box of this invention is provided with a primary chamber and a secondary chamber located within the primary chamber. Molten metal flows through an entry portion of the primary chamber and passes under the secondary chamber before exiting the primary chamber through an exit portion thereof. Inclusions and inclusion clusters float up and out of the molten metal stream and are entrapped by the secondary chamber where they form a surface layer which can be readily skimmed from the metal or alloy being cast. The molten metal or alloy located within the secondary chamber is substantially stagnant permitting flotation of inclusions which are of a density somewhat close to that of the molten metal being cast.

Accordingly, it is an object of this invention to provide an improved process and apparatus for removal of inclusions and inclusion clusters from molten metal in a transfer launder prior to casting.

It is a further object of this invention to provide a process and flotation box for removal of inclusions from molten metal in a transfer launder where the inclusions have a density fairly close to that of the molten metal or alloy to be cast.

It is a further object of this invention to provide a process and flotation box for removal of inclusions and inclusion clusters characterized by provision of an area within the flotation box which provides a substantially stagnant pool of molten metal, whereby buoyant inclusions and inclusion clusters may float up and out of the molten metal or alloy to be cast.

It is a still further object of this invention to provide a process and flotation box for removing inclusions and inclusion clusters from a stream of molten metal or alloy whereby the stream passes relatively rapidly through a primary chamber of the flotation box while the inclusions and inclusion clusters rise to the surface of a stagnant molten metal pool located in an inner secondary chamber of the flotation box.

These and other objects will become more apparent from the following description and drawings.

DETAILED DESCRIPTION OF THE PREFERRED EMBODIMENT

Figure 1:
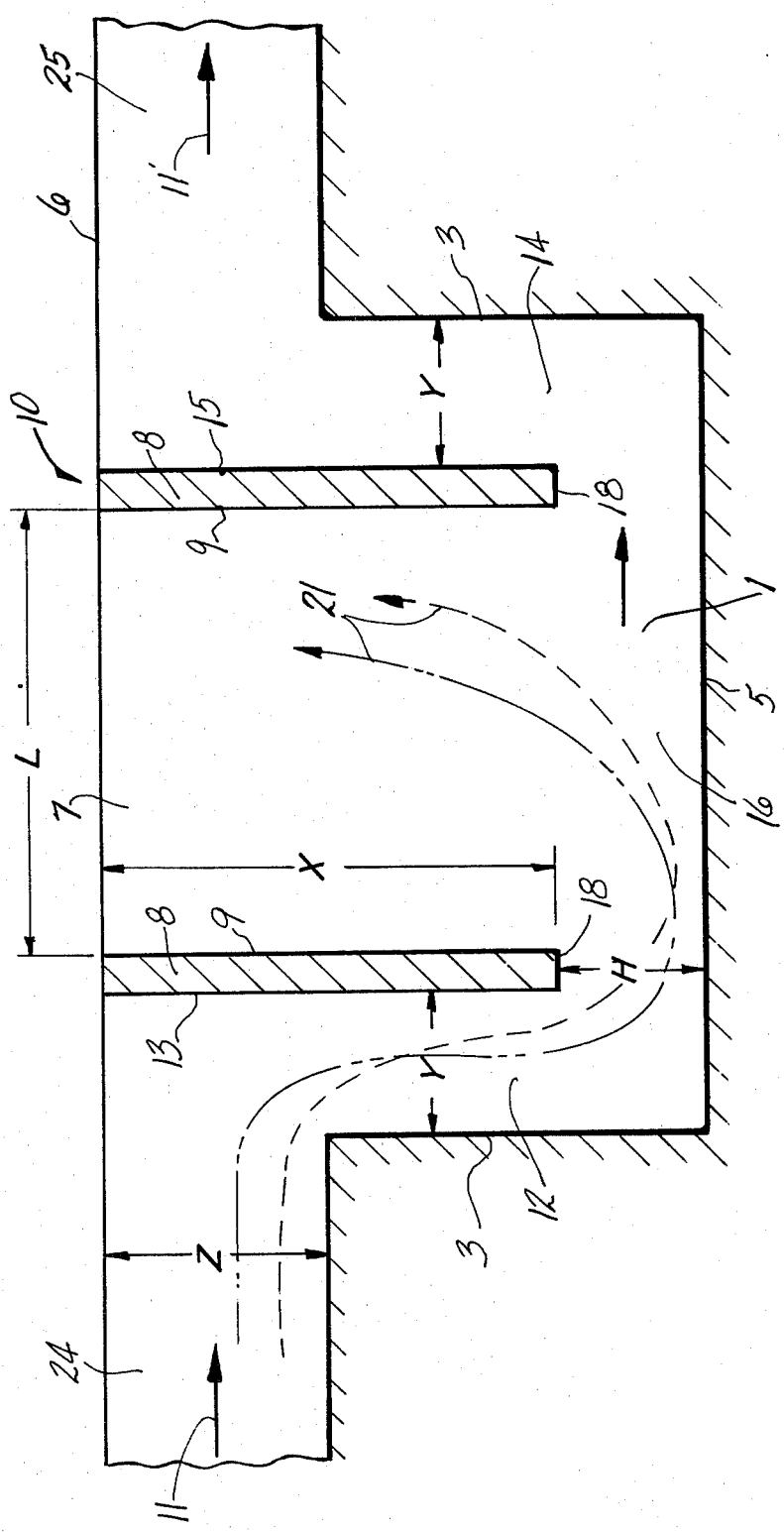
FIG. 1 is a side view in cross section of the flotation box in accordance with the present invention showing the flow pattern of molten metal or alloy, and showing the path of inclusion clusters.

Referring now to FIG. 1 there is shown therein a flotation box 10 in accordance with this invention. Flotation box 10 comprises a primary chamber 1 formed by the bottom wall 5, front and back walls 3 and side walls which run the length of the box 10, (the top of which are designated 6 in FIG. 1). Formed within primary chamber 1 are entry and exit portions 12 and 14 respectively, which portions are formed by side walls 3 and outer walls 13 and 15 respectively of baffles 8. Baffles 8 also form, via internal walls 9, a secondary chamber 7 located within primary chamber 1. The ends 18 of baffles 8 are spaced a distance H from the bottom 5 of flotation box 10 to provide a molten metal or alloy through passage area 16 between walls 3.

The drawing contains various dimensional designations indicating various dimensions which when varied will greatly affect the flow characteristics and therefore inclusion removal characteristics of flotation box 10. Molten metal or alloy supply passages 24 and 25 which supply molten metal or alloy to primary chamber 1 and the casting apparatus (not shown) respectively have a height Z, while entry and exit portions 12 and 14 have a length Y. Secondary chamber 7 has a height X and a length L.

Supply passages 24 and 25 and primary chamber 1 may be of different widths but are preferably of the same width. Similarly dimensions Z, Y, H and L may all be varied, but assuming a uniform width along the length of flotation box 10, it is preferable to provide the dimensions Z, Y, and H equal. Such provision will enhance the laminar flow characteristics of the molten metal thereby minimizing turbulence. In addition, laminar flow through passages 24, 25 and 16 and portions 12 and 14 provide for enhanced stagnation of molten metal in secondary chamber 7 and enhanced removal of inclusions and inclusion clusters from the molten metal stream.

Figure 2:
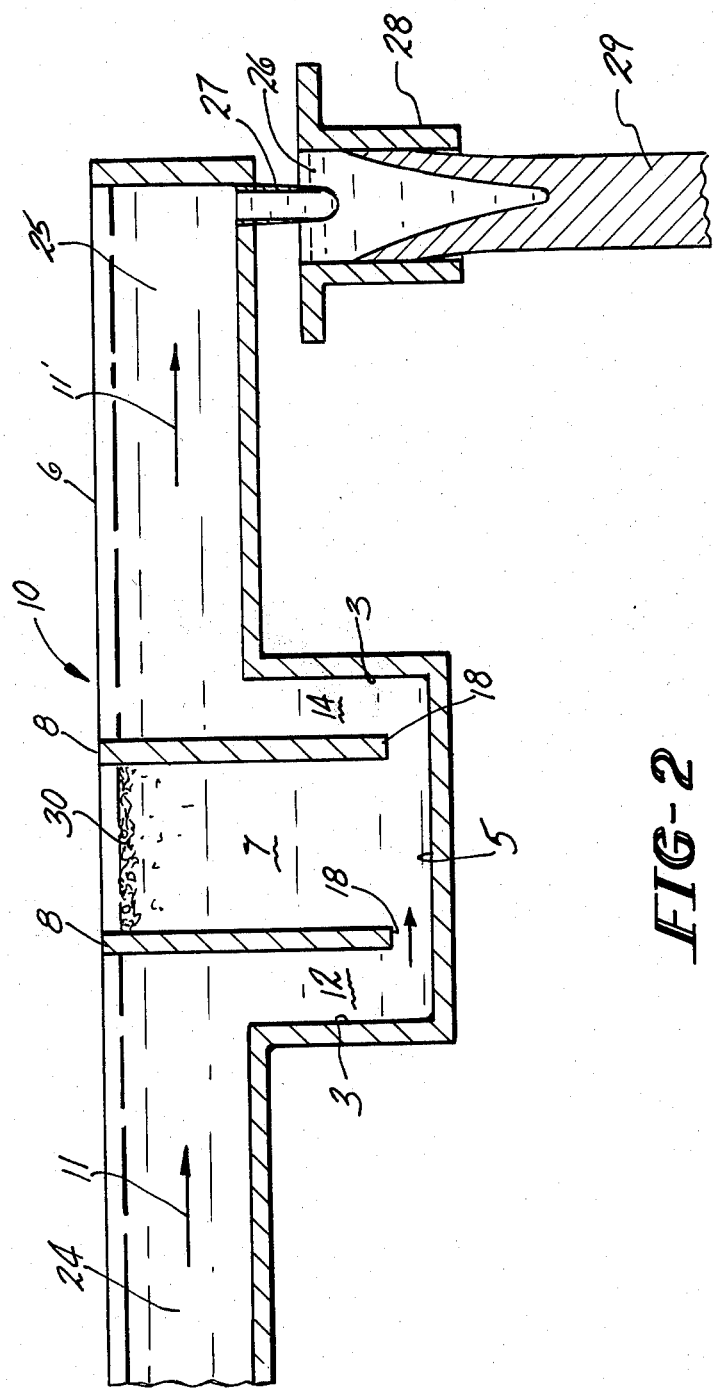
FIG. 2 is a side view in cross section of a combination flotation box and direct chill casting station in accordance with this invention.

The operation of flotation box 10 is as follows. A supply of molten metal or alloy carrying inclusions and inclusion clusters therein flows into flotation box primary chamber 1 via supply passage 24 as shown by flow direction arrow 11. The molten metal flow stream is directed through primary chamber entry portion 12 and under the baffle 8 having outer wall 13. The major portion of the molten metal or alloy flow stream flows along bottom wall 5 and is directed upward through primary chamber exit portion 14 between baffle 8 outer wall 15 and wall 3, finally passing through supply passage 25 (flow direction arrow 11') and ending up in any suitable casting apparatus (FIG. 2). In flowing between primary chamber entry and exit portions 12 and 14 the inclusions and inclusion clusters (as well as a small proportion of molten metal or alloy) rise within the molten metal or alloy stream and into secondary chamber 7, as depicted by dashed arrows 21. The molten metal located within secondary chamber 7 remains essentially stagnant, thus enabling the inclusions and inclusion clusters to float to the top of secondary chamber 7 where they form a layer 30 (FIG. 2) which may readily be skimmed off the surface of the molten metal or alloy pool found therein.

Referring now to FIG. 2 there is shown therein a flotation box 10 for removing inclusions and inclusion clusters 30 from molten metal or alloy 26 which is supplied to direct chill casting mold 28 through spout 27. Ingot 29 is formed by direct chill casting mold 28 in any conventional DC casting process. Flotation box 10 could be utilized in supplying laundered molten metal or alloy to any suitable casting device or station.

Use of the flotation box of this invention provides several advantages over use of a system involving turbulent flow or filter media. Because of the laminar flow of this invention there is no pressure drop or head differential. In addition, in the absence of filter media no plugging can occur. Thus, a simple system is provided for effective removal of inclusions and inclusion clusters without complex operational and maintenance considerations.

Inclusion and inclusion cluster removal is enhanced by the following factors: increased inclusion or particle size, decreased inclusion density, particle shape, molten metal or alloy temperature and viscosity, decreased molten metal or alloy velocity along the bottom of the primary chamber (either by increasing the primary chamber width and/or height H, and/or by decreasing casting rate), and increasing secondary chamber length L between baffles 8. Flotation box design should, therefore, be such to affect maximum inclusion removal within the space limitations of the transfer launder in question.

Figure 3:
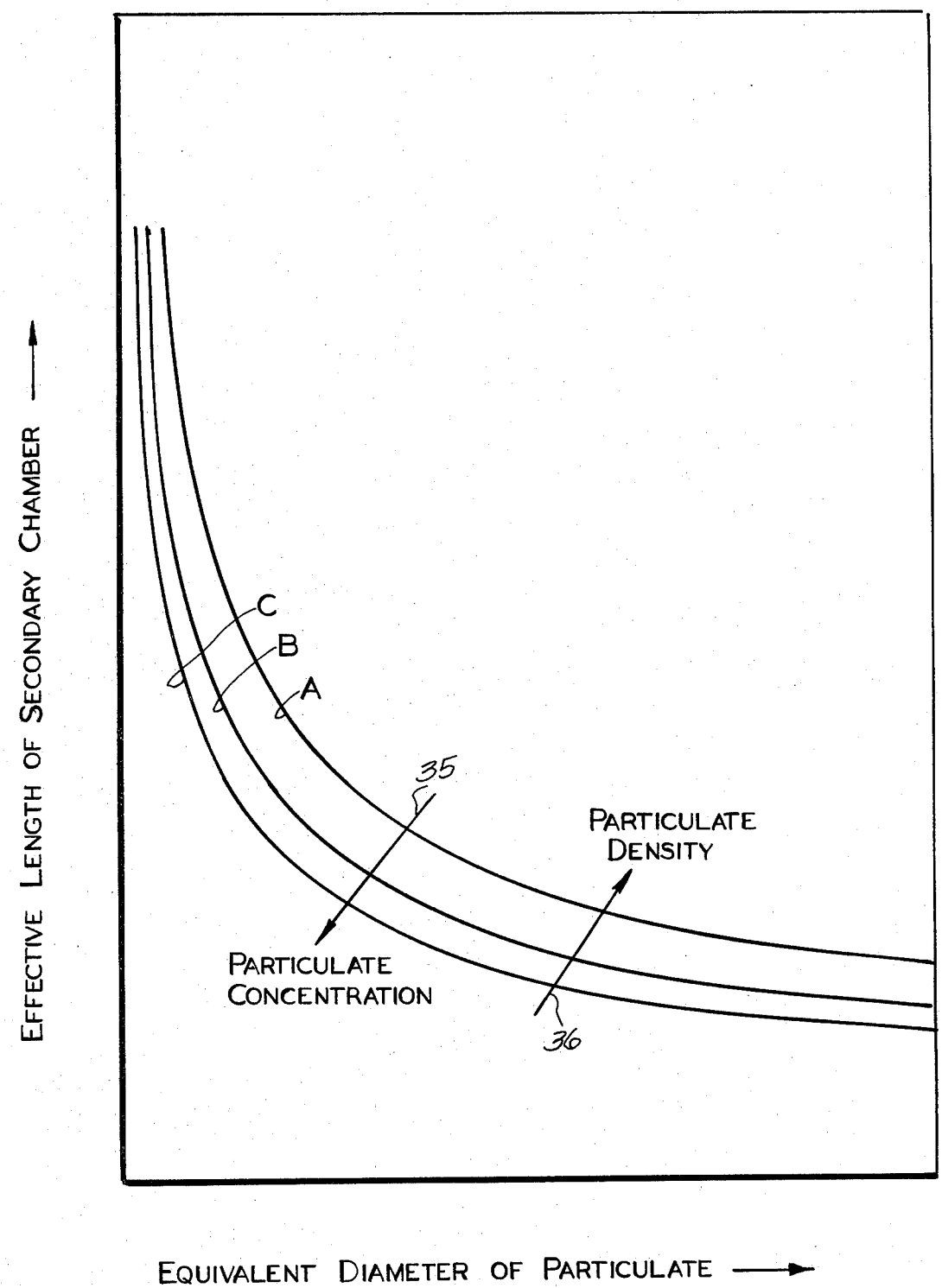
FIG. 3 is a representation of the correlation between the effective length of the secondary chamber of this invention and the inclusion or particulate diameter, further indicating the effects of the density of the particulate and the difference in density between particulate and molten metal.

FIG. 3 depicts three plots for various concentrations and density particular in the same molten metal which has been laundered in accordance with the flotation box teachings of this invention. As can readily be seen from FIG. 3, as particular size increases the effective length L of the secondary chamber decreases or conversely, as the particular decreases in size longer secondary chamber length L is required. Plots A, B, and C represent three different concentrations and densities of particular in the same molten metal. Plot A depicts the highest density and lowest concentration by weight of particular while plot C depicts the lowest density and highest concentration by weight. Plot B represents particular ranges intermediate those for plots A and C. As is indicated by arrow 35, as the percentage concentration by weight of the particular increases the effective length L of secondary chamber 7 decreases for particular of a given size. Arrow 36 indicates that as the density of the particular increases the effective length L of secondary chamber 7 increases for particular of a given size.

While this invention is particularly useful in removing inclusions from copper alloys it is nevertheless also applicable to any metal or alloy system in which the inclusion to be removed is less dense than the molten metal or alloy.

The present invention will be more readily understood from a consideration of the following illustrative examples:

EXAMPLE 1

Several DC cast ingots, 6"×30" in cross section of an alloy containing about 0.1% mischmetal (a mixture of rare earths, predominantly Ce and La), 0.03% P, balance Cu, were cast using a straight launder without any provision for inclusion removal. Although casting and hot rolling of these ingots were accomplished without problem, coil milling of many of the hot rolled plates showed large slivers and plane defects, which could be up to several inches in diameter. Those ingots which did not show the defects after coil milling were cold rolled to thin gage sheet, where cloudy patches appeared on the metal sheet surfaces.

The defects noted after coil milling and cold rolling were both traced to the presence of inclusion clusters consisting of a network of mischmetal oxides and/or sulfides comprising 5–10% by weight of the cluster, and 90–95% by weight of the copper alloy. Because the density of mischmetal oxides and sulfides are less than that of molten copper, these particles would be expected to float in molten copper.

EXAMPLE 2

A DC cast ingot, 6"×30" in cross section, of an alloy containing about 0.1% mischmetal, 0.03% P, balance Cu was cast using a launder containing a flotation box such as shown in FIG. 1.

The cast bar was virtually free of inclusion clusters, as determined by metallography of the cast bar itself, and by processing 2" thick blocks of the bar to 0.012" gage and looking at the milled hot rolled plate and final gage sheet. Skimmings from the top of flotation box showed numerous mischmetal oxide-sulfide inclusion clusters which had floated out of the molten metal stream.

It is apparent that there has been provided in accordance with this invention both a process and means for removing inclusions and inclusion clusters from molten metal and alloys, which fully satisfy the objects, means, and advantages as set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the broad scope and spirit of the appended claims.

What is claimed is:

1. A process for separating inclusions and inclusion clusters from a stream of molten metal or alloy, including the steps of:
   (A) providing a flotation box having:
   primary chamber means for directing a stream through said flotation box as a substantially laminar flow;
   secondary chamber means located within and spaced above the bottom of said primary chamber means defining a secondary chamber for containing a substantially stagnant pool of molten metal or alloy for separating and entrapping inclusions and inclusion clusters which rise up through said stagnant pool from within the molten metal or alloy flowing through said primary chamber means;
   said secondary chamber means formed by a portion of two lateral walls of said flotation box and two transverse baffles extending between the lateral walls, said baffles having bottom surfaces spaced above a bottom of said primary chamber means;
   said primary chamber means having entry and exit channels formed by outer walls of said flotation box and said baffles;
   said primary chamber means further having a through-passage defined by said bottom surfaces of the baffles and the bottom of the primary chamber means and arranged below the entry channel and the exit channel;
   said through-passage providing a flow path between said entry and exit means for directing a stream of molten metal or alloy under the secondary means and in fluid contact with said secondary chamber;
   said entry channel, exit channel, and through-passage having cross sections, taken transverse to the direction of flow of a stream of metal or alloy through each of said channels and passage, of substantially equal area for enhancing the laminar flow characteristics of said stream of molten metal or alloy flowing through said primary chamber means; and
   (B) feeding molten metal or alloy to said flotation box comprising the steps of:
   directing said stream through the primary chamber as a substantially laminar flow;
   containing a substantially stagnant pool of molten metal or alloy in said secondary chamber;
   separating and entrapping inclusions and inclusion clusters with a stream of molten metal or alloy which rise up into said secondary chamber from the molten metal or alloy flowing through the primary chamber; and
   causing said stream to flow downward through said entry channel, beneath said secondary chamber in said through-passage and in fluid contact with said secondary chamber and upward through said exit channel.

2. The process of claim 1 including the steps of:
   providing a first supply passage in flow communication with the entry channel for supplying molten metal or alloy to the entry channel;
   providing a second supply passage in flow communication with the exit channel for receiving molten metal or alloy from the exit channel,
   said first and second supply passages having cross sections, taken transverse to the direction of flow of a stream of metal or alloy through each of said supply passages, of substantially equal area to each other and to said entry and exit channels, and said through-passage for enhancing the laminar flow characteristics of said stream of molten metal or alloy.

3. A flotation box for separating inclusions and inclusion clusters from a stream of molten metal or alloy comprising:
   primary chamber means for directing a stream through said flotation box as a substantially laminar flow;
   secondary chamber means located within and spaced above the bottom of said primary chamber means defining a secondary chamber for containing a substantially stagnant pool of molten metal or alloy for separating and entrapping inclusions and inclusion clusters which rise up through said stagnant pool from within the molten metal or alloy flowing through said primary chamber means;
   said secondary chamber means formed by a portion of two lateral walls of said flotation box and two transverse baffles extending between the lateral walls, said baffles having bottom surfaces spaced above a bottom of said primary chamber means;
   said primary chamber means having entry and exit channels formed by outer walls of said flotation box and said baffles;
   said primary chamber means further having a through-passage defined by said bottom surfaces of the baffles and the bottom of the primary chamber means and arranged below the entry channel and the exit channel;
   said through-passage providing a flow path between said entry and exit means for directing a stream of molten metal or alloy under the secondary means and in fluid contact with said secondary chamber;
   said entry channel, exit channel, and through-passage having cross sections, taken transverse to the direction of flow of a stream of metal or alloy through each of said channels and passage, of substantially equal area for enhancing the laminar flow characteristics of said stream of molten metal or alloy flowing through said primary chamber means.

4. The flotation box of claim 3 wherein said through passage has a height extending from the bottom of said primary chamber means to the bottom surfaces of said transverse baffles, a width defined by the distance between said lateral walls and a length defined by the distance between said outer walls.

5. The flotation box of claim 4 further including:

a first supply passage means in flow communication with the entry channel for supplying molten metal or alloy to the entry channel;

a second supply passage means in flow communication with the exit channel for receiving molten metal or alloy from the exit channel;

said first and second supply passage means each having cross sections, taken transverse to the direction of flow of a stream of metal or alloy through each of said supply means of substantially equal area with said entry and exit channels, and said through-passage for enhancing the laminar flow characteristics of said stream of molten material or alloy flowing through said flotation box.

6. The flotation box of claim 3 wherein said first and second supply passage means, said primary chamber means, and said secondary chamber means have a substantially equal width for enhancing the laminar flow characteristics of the molten metal or alloy.

* * * * *